No. 761,412. Patented May 31, 1904.

UNITED STATES PATENT OFFICE.

HERMANN SCHRADER, OF HÖNNINGEN, GERMANY.

ORGANIC ACID FROM BEET-ROOT MOLASSES AND PROCESS OF MAKING SAME.

SPECIFICATION forming part of Letters Patent No. 761,412, dated May 31, 1904.

Application filed July 1, 1902. Serial No. 114,008. (No specimens.)

*To all whom it may concern:*

Be it known that I, HERMANN SCHRADER, a subject of the Emperor of Germany, residing at Hönningen-on-the-Rhine, in the Kingdom of Prussia and Empire of Germany, have discovered a new and useful Organic Acid Obtained from the Final Beet-Root Molasses and a Process of Extracting the Same, of which the following is a specification.

My invention relates to the organic acids to be obtained from the final beet-root molasses derived from sugar by desaccharification or by fermentation and subsequent distillation of alcohol and the process of extracting same.

The organic acids from the vinasse form a soluble syrup-like matter the composition of which answers to the formula $C_5H_{13}NO_3$. The acid substance from the vinasse is probable betain acid, $COOH:CH_2.N(CH_3)_3OH$. It is, however, possible that the product contains compounds isomeric with the said acid. The acid is capable of reducing chromic compounds to chromous compounds and generally of reducing the higher oxids of metals to compounds containing less oxygen. It is easily soluble in water, difficultly in ether. The aqueous solution of the acid liberates hydrogen when in contact with metals, as zinc or iron, and liberates carbonic acid—viz., sulfurous acid—viz., sulfureted hydrogen—from carbonates, sulfites, sulfids. The acids are indicated by the fact that with chlorid of zinc they form a double salt which crystallizes in octagonal rectangular lamina (sheets) with cut edges. The acids have a pleasant aromatic odor and flavor and can be used as an addition to food-stuffs and such like, or as a substitute for fruit essences and such like, or as a substitute for tartaric acid and lactic acid for dyeing and printing purposes.

The process of extracting the acids, which are chiefly present in form of potassic salts, contained in the vinasse—as, for instance, the waste lyes from the desaccharification of molasses according to the barium-calcium or strontium process, likewise the residuary liquors from the distillation of fermented final molasses—consists therein that the acids can be obtained in a practical quantitative manner when freed by the action of sulfuric acid under certain conditions from the existing potassic salts, whereby the organic acids of the liquor separated from the eliminated salts are obtained in such form and concentration that a further technical use of them is possible.

I will hereinafter describe my process as applied to the vinasse remaining from the desaccharification by baryta. The experienced workman will be able to apply this process according to the instructions given to other desaccharified liquors obtained in the beet-sugar manufacture.

Five hundred kilograms of vinasse of 1.225 specific gravity with alkali calculated to 9.7 per cent. to potassium, respectively, 17.16 per cent to potash or 21.64 to potassium sulfate are first of all concentrated to about three hundred and seventy kilograms—that is, about 1.4 specific gravity. They are then continuously mixed with a mixing-machine for about one hour with 66.2 kilograms sulfuric acid of 92.1 per cent. $H_2SO_4$, the sulfuric acid being slowly poured into the liquor during the process of mixing. The temperature at the start must be about 30° centigrade and at the finish about 70° centigrade. The normal sulfate of potash is precipitated in fine grains. The liquor is separated from the precipitate, the crystals are filtered off or decanted, and the liquor, which now contains only about 1.7 to two per cent. potassium, is left standing warm in wooden boxes or such like for several days, whereby further quantities of potassium sulfate are eliminated—an operation which may also be performed by inspissation at temperatures up to 100° in vacuum and, further, by concentration of the solution by freezing. The remaining acid liquor, (about three hundred and forty kilograms,) which now contains only about 1.5 per cent. potassium and one per cent. sulfuric acid, is then brought to boil with wet steam, and if it appears as suitable about two hundred kilograms of water are added to make it more liquid. It is then treated for some time with steam in order to remove any odor. It is then treated in a heated state with carbonate of barium (6.8 kilograms) for precipitating sulfuric acid and then filtered. The still hot filtered matter is then mixed with animal charcoal and boiled. After about two hours it is filtered, and the remaining liquor, of a pleasant aromatic odor and flavor, is ready for further use.

What I claim, and desire to secure by Letters Patent of the United States, is—

1. The organic acid of the vinasse, forming a syrup-like substance of light-yellow color, having an aromatic odor and flavor having the composition $C_5H_{13}NO_3$ and corresponding probably to the constitution $$COOH:CH_2N(CH_3)_3OH,$$

being easily soluble in water, difficultly in ether.

2. The process of extraction of organic acids from vinasse, which consists in concentrating the vinasse, mixing the same in a warm condition with a quantity of sulfuric acid necessary for the neutralization of the alkali, cooling the liquid, separating the eliminated potassium sulfate, and then treating the separated liquid in a hot condition with decolorizing agents.

3. The process of extraction of organic acids from vinasse, which consists in concentrating the vinasse to a specific gravity of about 1.4, mixing the concentrated vinasse in a warm condition with a quantity of sulfuric acid sufficient to neutralize the alkali, cooling the liquid, separating the potassium sulfate formed, treating the separated liquid to still further separate remaining quantities of potassium sulfate, treating the liquid to eliminate the sulfuric acid present, then treating the liquid in a hot condition with decolorizing agents.

4. The process of extraction of organic acids from vinasse, which consists in concentrating the vinasse, mixing the concentrated vinasse with a quantity of sulfuric acid sufficient to neutralize the alkali, allowing the liquid to cool, separating the liquid from the potassium sulfate formed, treating the separated liquid to still further separate remaining quantities of potassium sulfate, treating the liquid with steam, treating the liquid to precipitate the sulfuric acid present, separating the liquid from the precipitate, then treating the liquid in a hot condition with decolorizing agents.

HERMANN SCHRADER.

In presence of—
CHARLES L. SIMPLE,
CARL SCHMITT.